(12) United States Patent
Spengler et al.

(10) Patent No.: US 7,823,688 B2
(45) Date of Patent: Nov. 2, 2010

(54) ELECTRIC POWER STEERING SYSTEM WITH BELT DRIVE

(75) Inventors: Matthias Spengler, Baumweiler (DE); Jens Keppler, Weißenhorn (DE); Jens Stolzenburg, Ilsfeld-Auenstein (DE)

(73) Assignee: ThyssenKrupp Presta SteerTec GmbH, Dusseldorf (DE)

( * ) Notice: Subject to any disclaimer, the term of this patent is extended or adjusted under 35 U.S.C. 154(b) by 0 days.

(21) Appl. No.: 12/523,950

(22) PCT Filed: Jan. 7, 2008

(86) PCT No.: PCT/EP2008/000050

§ 371 (c)(1),
(2), (4) Date: Jul. 21, 2009

(87) PCT Pub. No.: WO2008/089882

PCT Pub. Date: Jul. 31, 2008

(65) Prior Publication Data

US 2010/0044145 A1    Feb. 25, 2010

(30) Foreign Application Priority Data

Jan. 24, 2007   (DE) .................. 10 2007 004 521

(51) Int. Cl.
*B62D 5/00*   (2006.01)
(52) U.S. Cl. .................. 180/444; 180/443; 474/133
(58) Field of Classification Search ............... 180/443, 180/444; 474/133
See application file for complete search history.

(56) References Cited

U.S. PATENT DOCUMENTS

| 6,960,145 | B2* | 11/2005 | Fraley et al. | 474/134 |
|---|---|---|---|---|
| 7,490,696 | B2* | 2/2009 | Saruwatari et al. | 180/444 |
| 7,510,045 | B2* | 3/2009 | Bareis et al. | 180/444 |
| 2005/0133297 | A1* | 6/2005 | Chikaraishi | 180/444 |
| 2005/0189162 | A1* | 9/2005 | Sasaki et al. | 180/444 |
| 2007/0095600 | A1* | 5/2007 | Jo et al. | 180/444 |
| 2008/0035415 | A1* | 2/2008 | Namgung | 180/444 |

FOREIGN PATENT DOCUMENTS

JP    2005 349862 A    12/2005

OTHER PUBLICATIONS

International Preliminary Report on Patentability and Written Opinion issued in related International Application No. PCT/EP2008/000050 and its English language translation.

* cited by examiner

*Primary Examiner*—Lesley Morris
*Assistant Examiner*—Tashiana Adams
(74) *Attorney, Agent, or Firm*—Connolly Bove Lodge & Hutz LLP

(57) ABSTRACT

The invention relates to an electric power steering for a motor vehicle, that may include a gear rack (11) that is positioned axially displaceable inside a steering housing (1) and can be driven by an electric servomotor (16), arranged inside a motor housing (7), with the aid of a belt (14) and a gear (12) for assisting with the steering. A simple and reliable belt tensioning is possible by providing an insertion wedge (21) between the motor housing (7) and the steering housing (1), which pushes the motor housing (7) away from the steering housing (1) for the purpose of tensioning of the belt (14).

9 Claims, 3 Drawing Sheets

Figure 3:
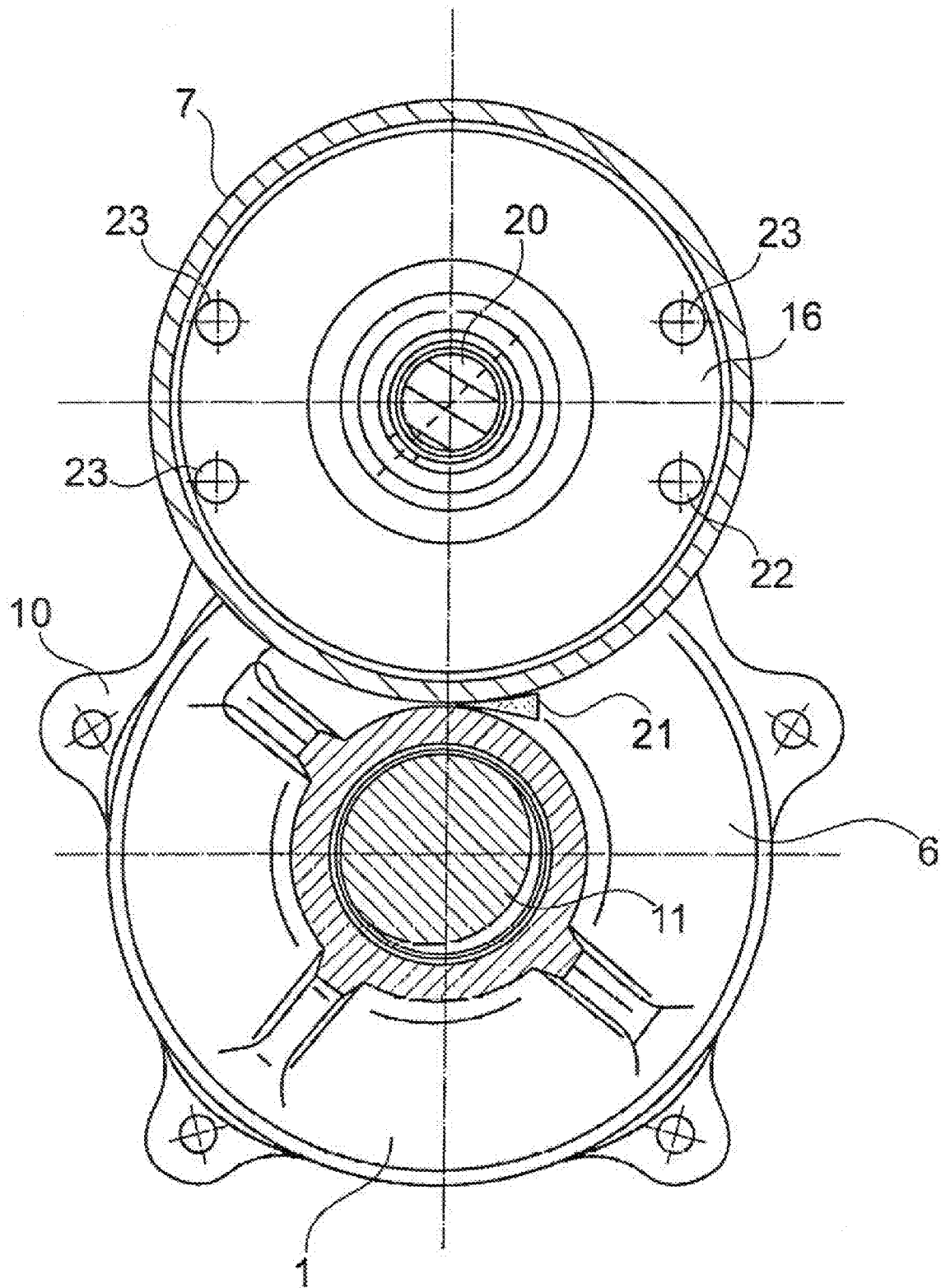

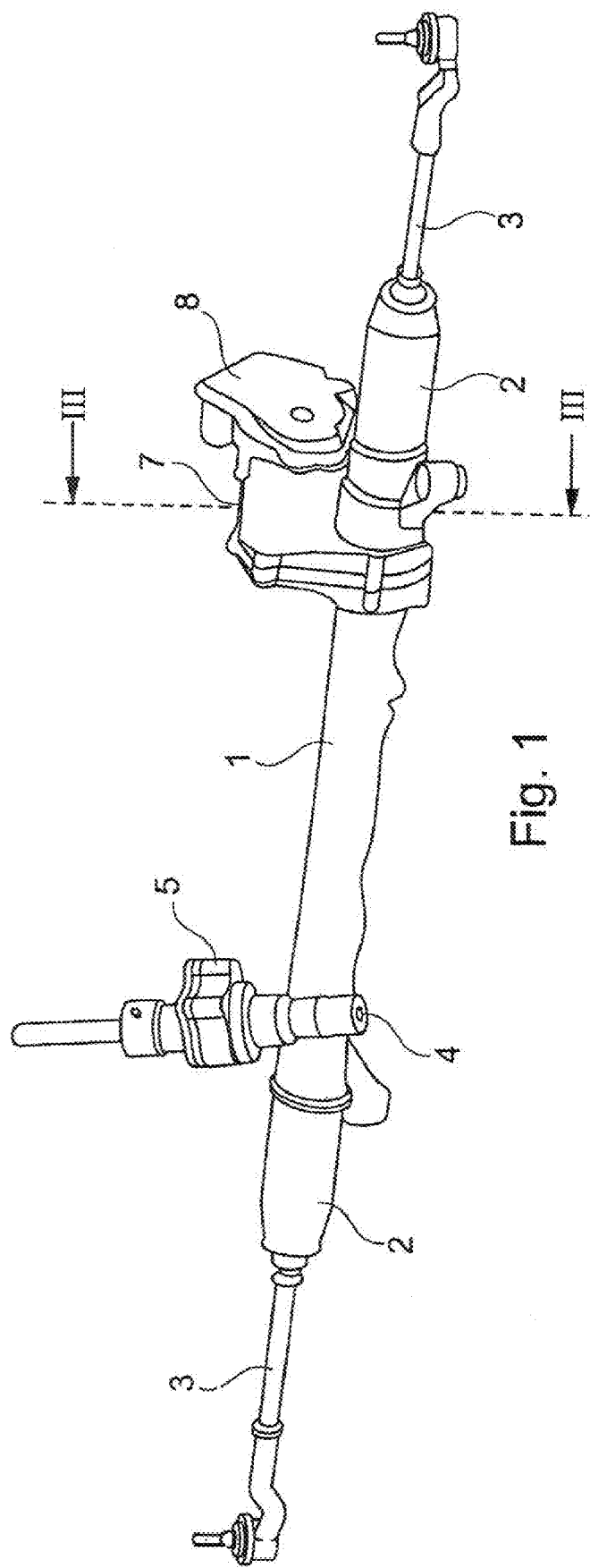
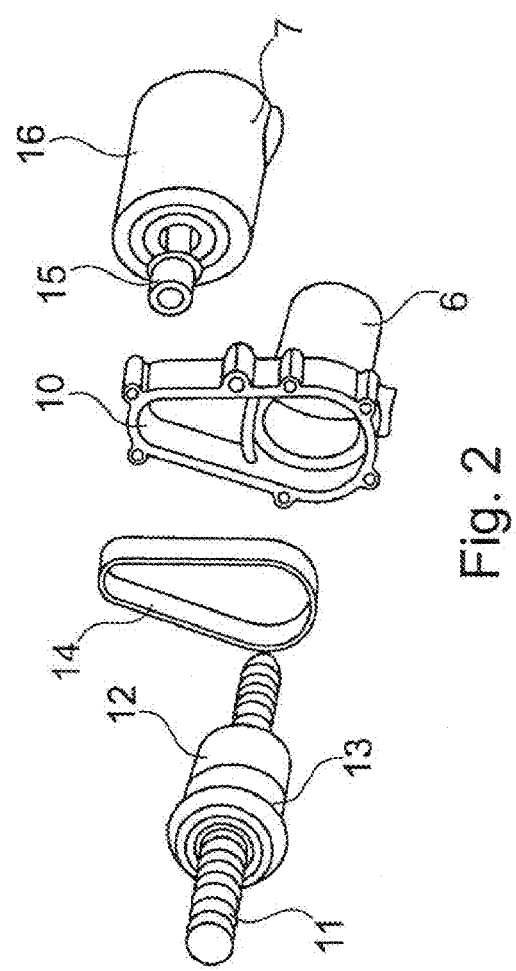
Fig. 1
Fig. 2

ELECTRIC POWER STEERING SYSTEM WITH BELT DRIVE

CROSS REFERENCE TO RELATED APPLICATIONS

This application is a national phase of PCT/EP2008/000050, filed on Jan. 7, 2008, which claims priority to German Application No. 10 2007 004 521.4, filed Jan. 24, 2007, the entire contents of both of which are hereby incorporated by reference.

The present invention relates to an electric power steering.

One such electric power steering is known from the German document DE 10052275 A1. With this electric power steering, an electric servomotor provides a steering assistance, for which power is transferred via a belt pulley, a toothed belt and a reduction gear to the gear rack. Not least because of the desire for low noise, it is necessary to keep the belt drive play as low as possible and, in particular, to ensure a constant belt tension in both movement directions of the drive.

With the known electric power steering, the pre-tensioning is achieved by using a fixedly adjusted tensioning roller that fits against the backside of the toothed belt.

A different option for tensioning a circulating driving means in both movement directions of the drive is known from the British Patent document GB 1,117,863. With this device, a chain drive having one immovably positioned shaft and one shaft positioned displaceably is tensioned by pushing the displaceable bearing block with the aid of a spring-tensioned wedge away from the fixedly positioned shaft.

Finally, two different methods for adjusting the belt tension are known from other types of an electromechanical power steering. On the one hand, the belt tension can be adjusted with the aid of an eccentric cam plate while, on the other hand, pulling devices are used that pull the motor housing away from the steering housing and thus tension the belt. These solutions are involved and accordingly expensive.

It is therefore the object of the present invention to improve a power steering of the aforementioned type in such a way that the belt tension can be fixedly adjusted during the assembly, thereby making it unnecessary for additional components such as a tensioning roller to rest against the belt, consequently preventing additional wear caused by a tensioning element. The intent is furthermore to avoid additional and expensive adjustment elements, which make the adjustment process more complicated.

This object is solved with an electric power steering having the features as disclosed in claim 1 and with a method having the features as disclosed in claim 8.

With an electric power steering for a motor vehicle, comprising a gear rack that is positioned axially displaceable inside a steering housing and is driven by an electric servomotor arranged inside a motor housing with the aid of a belt and a gear assembly to assist with the power steering, an insertion wedge is provided between the motor housing and the steering housing for tensioning the belt. This insertion wedge pushes the motor housing away from the steering housing, thus making it possible to adjust the tension easily and reliably during the assembly, wherein the effectiveness of the tensioning device is not expected to decrease during the operating period of the product. The insertion wedge is furthermore a very cheap component, which results in an economic advantage.

It is particularly advantageous if the belt is a toothed belt. The gear can furthermore be embodied as a ball screw.

The motor housing is attached with at least two fastening means in the form of screws or stud bolts to the steering housing. The through bores in the housing to be attached are embodied as elongated holes or as oversized holes, so that the motor housing can be displaced relative to the steering housing before the final tightening of the fastening means. One of the fastening means is advantageously embodied as a pivot bearing, so that the motor housing can be pivoted for the belt tightening.

An accidental loosening of the belt tension during the fastening operation is reliably prevented if the insertion wedge is provided with a tooth-type notching on at least one wedge surface, in particular with a saw tooth profile.

Defined assembly positions are obtained if the steering housing, respectively the motor housing is provided with contact surfaces for the insertion wedge. A stepwise engaging adjustment can thus be achieved, provided that at least one of the contact surfaces has a tooth-type notching that complements the tooth-type notching on the insertion wedge.

The one-part solution is therefore considered particularly advantageous since the component can be produced easily, e.g., with an injection-molding process, and because it can be attached easily to the steering housing by fitting on the guide shoe.

As a result of a one-piece embodiment of the guide shoe with the wedge by means of a poured-on loop or with the aid of a two-part captive embodiment, the toothed belt tension can be adjusted immediately after assembling the gear unit by inserting the wedge which is located at the other end of the loop into the guide shoe.

A method for tensioning the belt of an electric power steering for a motor vehicle, configured as described in the above, involves the following steps:

Pre-assembling the motor housing with servo drive on the steering housing, which is already provided with the gear rack and the gear assembly as well as the belt, with the aid of fastening means in such a way that the motor housing can be pivoted around one of the fastening means, parallel to a flange;

Inserting an insertion wedge between the steering housing and the motor housing for tensioning the belt up to a specified value for the belt tension;

Tightening the fastening means for a permanent fixation of the motor housing in the achieved position.

If the servo drive is turned by at least one rotation prior to tightening the fastening means, wherein the belt tension is measured constantly, and the insertion wedge is pushed further between the steering housing and the motor housing if the belt tension drops below the minimum value in one position of the wedge, it is ensured that the tension does not drop below the minimum required belt tension.

Figure 4:
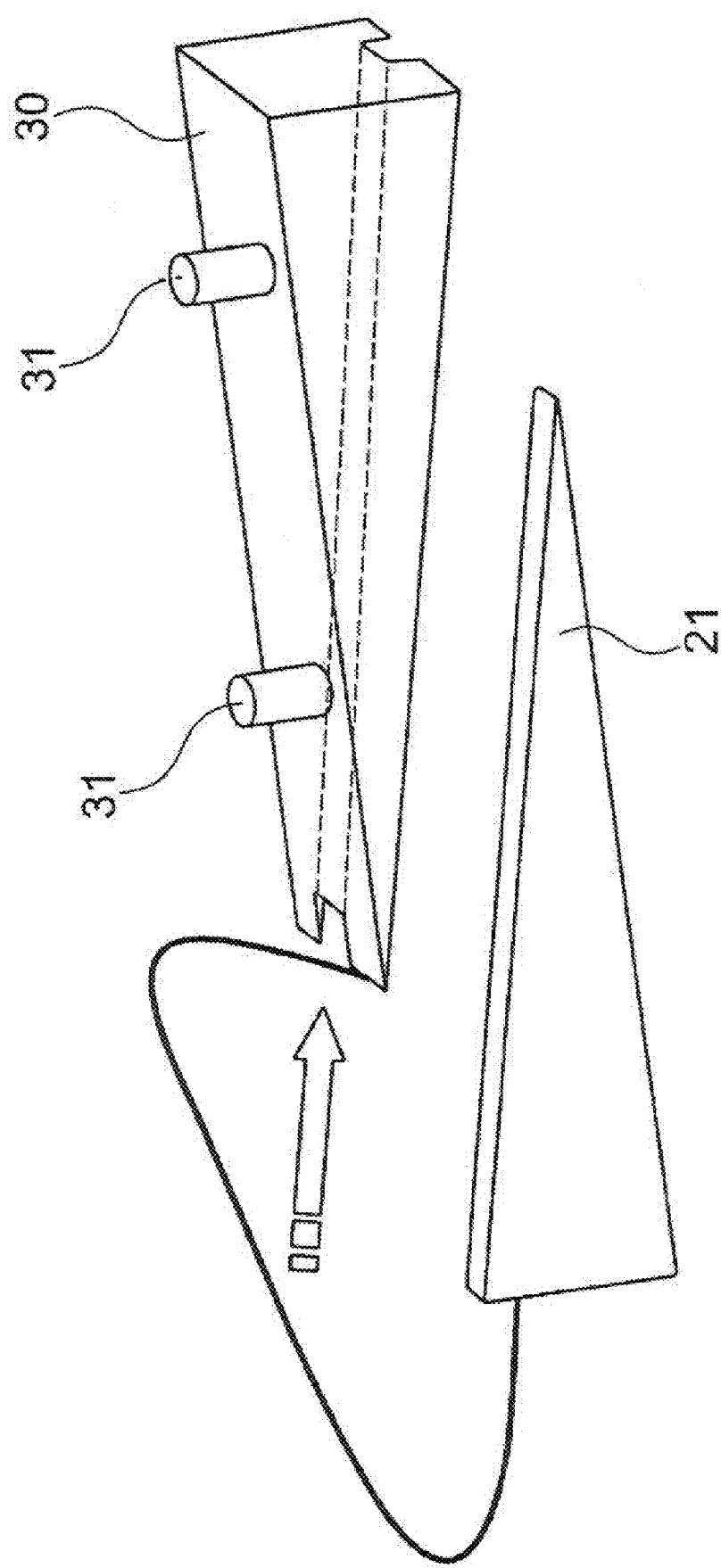

An exemplary embodiment of the present invention is described in the following with the aid of the drawings, which show in:

FIG. 1 An electric power steering with a servomotor arranged axis-parallel to the gear rack, shown in a perspective view;

FIG. 2 The servo drive for the steering shown in FIG. 1, in an exploded view;

FIG. 3 The power steering according to FIG. 1 and FIG. 2, shown in a radial section along the line III-III from FIG. 1; as well as FIG. 4 A view of a pre-assembled insertion wedge 21.

FIG. 1 shows an electric power steering with a steering housing 1 that surrounds a gear rack positioned displaceable on the inside. The gear rack is provided on each end with one ball joint surrounded by an expansion bellows 2. The ball joints in turn each carry one tie rod 3. A pinion housing 4 surrounds the steering pinion, which engages in the gear rack. The steering pinion in turn is embodied for the connection to a steering column and a steering wheel and furthermore comprises a torque sensor for the steering control, which is arranged inside a sensor housing 5.

At the opposite-arranged end of the steering housing 1, a reduction gear for driving the gear rack is arranged inside a detachable housing part 6. The housing part 6 furthermore comprises an additional motor housing 7, arranged at a distance and parallel to the steering housing 1. The motor housing 7 in turn comprises an electronic control 8 for activating the servomotor arranged inside the motor housing 7.

The servo drive component is shown in further detail in FIG. 2. The housing part 6 is provided with a flange 10 on its visible, flat side for attaching it to the non-visible steering housing 1. A gear rack 11 extends in longitudinal or axial direction through the housing part 6. The gear rack 11 carries a drive in the form of a ball screw 12, provided with balls, which engages without play in a corresponding gear of the gear rack 11. The ball screw 12 is positioned so as to be able to rotate inside the housing part 6. The ball screw 12 is provided along the circumference with a tooth-type notching 13 for the toothed belt 14. The toothed belt 14 in turn runs inside the housing part 6, from the ball screw 12 to a correspondingly embodied pinion 15 of the servomotor 16 that is arranged inside, the motor housing 7.

The further joint operation of all components described so far is known from the prior art and need not be described again herein. The same is true for the control unit and the operation of the power steering.

However, during the assembly of the component shown in FIG. 2, a defined pre-tensioning of the toothed belt 14 is necessary to prevent any play in the drive, as much as possible, in particular during a change in the rotational direction of the servomotor 16. The device and the method used for this are described in further detail with the aid of FIG. 3.

FIG. 3 shows a cross section through the power steering according to FIG. 1, approximately along the line III-III in FIG. 1. The view shown in the drawing represents a cross section in radial direction of the gear rack 11 and a motor shaft 20.

The gear rack 11 is positioned displaceable in axial direction inside sliding bearings, not shown herein, but moves without play in radial direction. The gear rack position in radial direction is accordingly fixed precisely. In the same way, the motor shaft 20 is positioned precisely in the bearings of the servomotor 16. The ball screw 12, which is arranged without play on the gear rack 11, also occupies a precisely defined position inside the housing part 6. With the completely assembled steering, the toothed belt 14 rests on the one hand on the tooth-type notching 13 and, on the other hand, on the pinion 15 of the servomotor 16. As a result, the toothed belt 14 can be tensioned by adjusting the distance between the motor shaft 20 and the gear rack 11. According to the prior art and as mentioned in the above, this is achieved with the aid of tensioning rollers, eccentric cam plates or pulling devices. The present invention solves this problem by using an insertion wedge 21, which is inserted between the steering housing, more precisely the housing part 6, and the motor housing 7. The insertion wedge 21 pushes the motor housing 7 away from the housing part 6 and thus pushes the motor shaft 20 with the pinion 15 away from the ball screw 12 with the tooth-type notching 13, thereby tensioning the toothed belt 14 that encircles both components.

This is achieved in detail by embodying a fastening screw 22 as pivot bearing for the motor housing 7, relative to the housing part 6, for example by inserting a sleeve into a bore, aligned so as to extend through both housing parts. The remaining three fastening screws 23 are fitted with one end into threaded bores, but extend with the other end through bores inserted in the housing part that is facing the screw head, wherein these bores are enlarged relative to the standard size. The housing bores can also be embodied as elongated holes that permit a pivoting of the motor housing 7 relative to the housing part 6. The toothed belt 14 can be tensioned in this way. However, each of the screws 23 can function as pivot bearing, depending on the installation position.

In practical operations, the belt-tensioning operation is realized such that the fastening screws 22 and 23 are initially inserted loosely during the assembly, for example using a first slight torque, which still permits a pivoting of the motor housing 7. The insertion edge 21 is then inserted in the position shown in FIG. 3 between the housing part 6 and the motor housing 7. The insertion wedge 21 is provided with a tooth-type notching on both its wedge surfaces, which prevent the insertion wedge 21 from sliding out of the position once it is reached. The insertion wedge 21 is then pushed far enough between the two housing parts, until the desired tension for the toothed belt 14 is reached. In the process, the motor housing 7 is pivoted around the threaded screw 22 and the belt tension is controlled via a force-distance measuring device. Once a specified value for the belt tension is reached, the tension is checked with the aid of a complete rotation of the device. If the value for the belt tension falls below the minimum value at one location, then the insertion wedge 21 can be pushed farther into the gap between the two housing parts. The fastening screws 22 and 23 are then tightened with a fixed torque. The insertion wedge 21 remains in the position reached to securely prevent a slowing down of the servomotor during the complete operating period of the power steering.

A particularly precise adjustment is possible if the insertion wedge 21 and the running surfaces embodied on the housing part for the insertion wedge 21 are provided with a saw tooth profile. In that case, the insertion wedge 21 can be advanced by respectively one tooth if desired, thus making it possible to gradually increase the belt tension.

Stud bolts can also be used as fastening devices for the motor housing 7, wherein the outer surface of the stud bolt and a corresponding bore in the surrounding housing can form at location 22 the pivot bearing for the motor housing 7. For a particularly precise adjustment of the belt tension, a pre-tightening moment can be determined for the fastening screws 22 and 23, thereby preventing a movement of the motor housing 7, relative to the housing part 6, even before the insertion wedge 21 is positioned.

FIG. 4 shows an insertion wedge 21 in a pre-assembled embodiment. The insertion wedge 21 is produced in this case together with a guide 30, wherein the interface between the guide 30 and the insertion wedge 21 contains the tooth-type notching that ensures the locking function for the tensioning device.

This combination unit can be attached particularly easily to the steering housing 1. The wedge-guide combination unit can optionally be a one-piece or a multi-piece solution, wherein the latter takes the form of a captive connection of the components. The combination unit can be embodied via a holding loop (one part solution) or via a form-locking connection, e.g. a conical guide groove or a dove-tailed guide (two part solution).

The wedge-guide combination unit is attached with the aid of the guide and suitable fastening options (clips) to the steering housing. The guide 30 for the exemplary embodiment is provided with two pins 31 for this, which can be fitted into corresponding bores in the steering housing 1 or the motor housing 7.

REFERENCE NUMBER LIST 1. steering housing
2. expansion bellows
3. tie rod
4. steering pinion housing
5. sensor housing
6. housing part
7. motor housing
8. control electronic
10. flange
11. gear rack
12. ball screw
13. tooth-type notching
14. toothed belt
15. pinion
16. servomotor
20. motor shaft
21. insertion wedge
22. fastening screw
23. fastening screw
30. guide
31. pin

The invention claimed is:

1. An electric power steering for a motor vehicle, comprising a gear rack that is positioned axially displaceably inside a steering housing and can be driven by an electric servomotor, located inside a motor housing, with the aid of a belt and a gear for assisting the steering, wherein an insertion wedge is provided between the motor housing and the steering housing, which pushes the motor housing away from the steering housing for the purpose of tensioning of the belt.

2. The power steering according to claim 1, wherein the belt is a toothed belt.

3. The power steering according to claim 1, wherein the motor housing is attached with at least two fastening means to the steering housing, wherein one of the fastening means is embodied as a pivot bearing.

4. The power steering according to claim 1, wherein the insertion wedge is provided with a tooth-type notching on at least one wedge surface.

5. The power steering according to claim 1, wherein the steering housing, respectively the motor housing, is provided with contact surfaces for the insertion wedge.

6. The power steering according to claim 5, wherein at least one of the contact surfaces is provided with a tooth-type notching that complements the tooth-type notching on the insertion wedge.

7. The power steering according to claim 1, wherein the insertion wedge is prefabricated together with a guide, either as a one-piece component or as captive two-piece component.

8. A method for tensioning the belt of an electric power steering for motor vehicles according to claim 1, using the following steps:
    pre-assembling the motor housing that comprises the servo drive on the steering housing, which accommodates the gear rack and the gear as well as the belt, with the aid if fastening means, wherein the motor housing can be displaced parallel to a flange;
    inserting an insertion wedge between the steering housing and the motor housing for tensioning the belt up to a specified value for the belt tensioning; and
    tightening the fastening means for a permanent fixation of the motor housing in the obtained position.

9. The method according to claim 8, further comprising turning the servo drive is turned by at least one rotation prior to tightening the fastening means, wherein the belt tension is measured constantly and, if the belt tension falls below a minimum value in one position, the insertion wedge is pushed further into the area between the steering housing and the motor housing.

* * * * *